US006525595B2

(12) United States Patent
Oku

(10) Patent No.: US 6,525,595 B2
(45) Date of Patent: Feb. 25, 2003

(54) BOOSTER, IC CARD HAVING THE SAME, AND ELECTRONIC EQUIPMENT HAVING THE SAME

(75) Inventor: Satoru Oku, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/795,194

(22) Filed: Mar. 1, 2001

(65) Prior Publication Data

US 2001/0026187 A1 Oct. 4, 2001

(30) Foreign Application Priority Data

Mar. 7, 2000 (JP) ........................................ 2000-061723

(51) Int. Cl.[7] ................................................ G05F 3/02
(52) U.S. Cl. ........................ 327/536; 327/390; 327/589
(58) Field of Search .................................. 327/390, 536, 327/589, 157, 537, 535; 363/59, 60

(56) References Cited

U.S. PATENT DOCUMENTS 5,191,232 A * 3/1993 Wang .......................... 327/306
5,907,484 A * 5/1999 Kowshik et al. ............... 363/60
6,075,402 A * 6/2000 Ghilardelli et al. .......... 327/536
6,100,752 A * 8/2000 Lee et al. .................... 327/536

FOREIGN PATENT DOCUMENTS

JP          2-62796          3/1990

* cited by examiner

Primary Examiner—Tuan T. Lam
Assistant Examiner—Hiep Nguyen
(74) Attorney, Agent, or Firm—Sughrue Mion, PLLC

(57) ABSTRACT

A booster is provided with first to k-th (k is an even number) transistors connected to one another in series, first to k-th capacitors each having an end connected to the gate and source of each of the first to k-th transistors, and a clock driver which supplies clock signals out of phase with one another to the other ends of the first to k-th capacitors. The clock driver simultaneously supplies low-level clock signals to two or more adjacent capacitors out of the first to k-th capacitors.

4 Claims, 20 Drawing Sheets

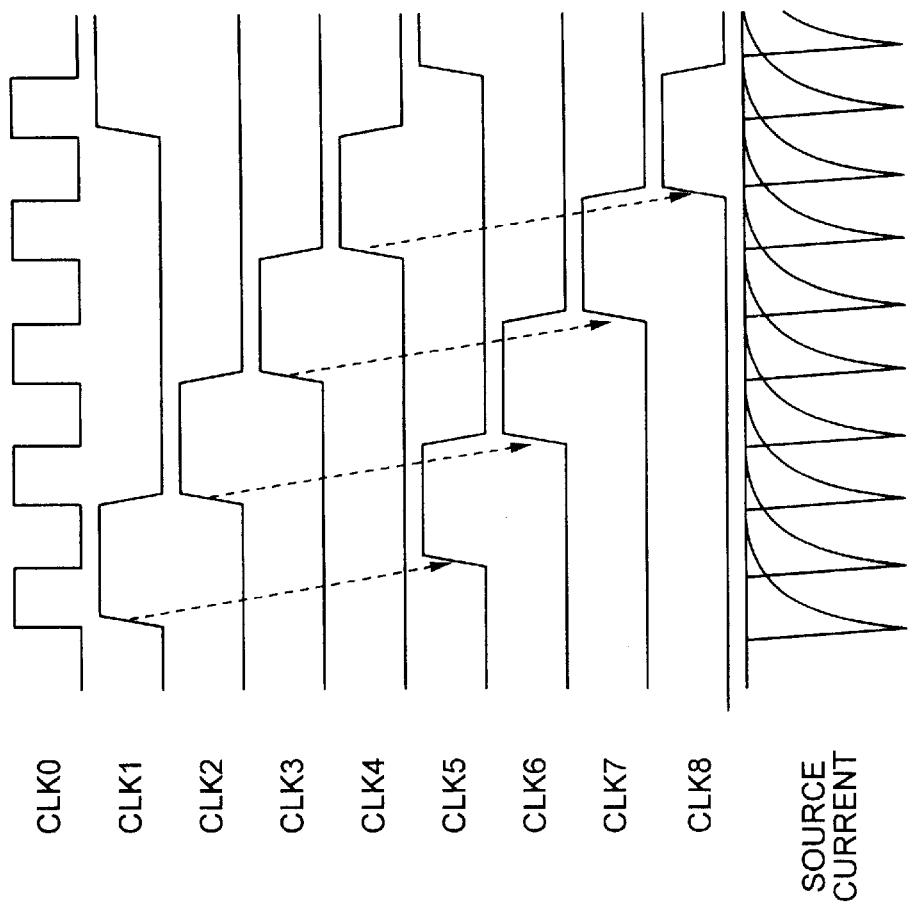

BOOSTER, IC CARD HAVING THE SAME, AND ELECTRONIC EQUIPMENT HAVING THE SAME

BACKGROUND OF THE INVENTION

1. Field of the Invention

The present invention relates to a booster for boosting a supplied voltage, an IC card having the same, and electronic equipment having the same. The present invention particularly relates to a booster for reducing a current peak and improving boosting efficiency, an IC card having the same, and electronic equipment having the same.

2. Description of the Related Art

Recently, a non-contact IC (integrated circuit) card has received attention as a recording medium. The non-contact IC card includes an EEPROM (Electrically Erasable Programmable Read Only Memory), receives by an antenna a high-frequency signal transmitted from a terminal equipment, and generates electricity for internal use.

FIG. 1 is a schematic diagram showing the relationship of voltages supplied to circuits in the non-contact IC card.

As shown in FIG. 1, a non-contact IC card 101 is provided with an RF circuit 102, which extracts a data component from a signal received by the antenna and generates an internal source voltage Vdd. A central processing unit (CPU) 103, an I/O circuit 104, and a peripheral circuit 105, which are operated by the internal source voltage Vdd, are further provided. The IC card 101 includes an EEPROM 106 for storing data and a charge pump 107 for generating a voltage Vpp, which is used for writing and deleting data in the EEPROM 106. Additionally, a decoder and the like in the EEPROM 106 are operated by the internal source voltage Vdd. Moreover, the IC card 101 is provided with a voltage regulator 108 for reducing the internal source voltage Vdd to a voltage for charge pump Vcp, which is applied to the charge pump 107, and a ring oscillator 109 for dividing the voltage for charge pump Vcp to produce a clock signal (frequency: about 4 to 8 MHz) of the charge pump 107.

Further, normally, the internal source voltage Vdd is set at about 2.2 to 3.3 V, the voltage for charge pump Vcp is set at about 2.0 to 2.5 V, and the voltage Vpp is set about 12 to 13 V.

Also, the magnitude of electricity (internal source voltage Vdd) generated by receiving a high-frequency signal is determined by a distance between the terminal equipment and the non-contact IC card, the shape of the antenna, and the like. The efficiency of generating electricity is not so high. Hence, the IC card 101 includes a security circuit 110 for suspending the operation of the CPU 103, the I/O circuit 104, the peripheral circuit 105, and the like to prevent malfunction thereof in the case of a drop in the internal source voltage Vdd.

A clock signal supplied to the CPU 103 is extracted from signals received in the RF circuit 102, and the clock signal is inputted as an operating clock signal (control clock signal) to the I/O circuit 104, the peripheral circuit 105, the security circuit 110, and the voltage regulator 108 as well as the CPU 103.

FIG. 2 is a circuit diagram showing an example of a conventional charge pump.

In the conventional charge pump, for example, a plurality of transistors Tr100, Tr101, Tr102, Tr103, Tr104, and the like are connected in series. A voltage for charge pump Vcp is supplied to the gate and source of the transistor Tr100.

Further, capacitors C101, C102, C103, C104, and the like each have a terminal connected to each node provided between the adjacent transistors. Inverters IV101, IV102, IV103, IV104, and the like are respectively connected to the other terminals of the capacitors. A clock signal CLK oscillated by the ring oscillator 109 is inputted to the inverters IV 101, IV103, and the like, and an inverted signal CLKB of the clock signal CLK is inputted to the inverters IV102, IV104, and the like. Therefore, the inverters IV101, IV103, and the like are simultaneously driven and the inverters IV102, IV104, and the like are simultaneously driven. Additionally, the clock signal CLK in FIG. 2 corresponds to the clock signal CLK shown in FIG. 1.

Moreover, Japanese Patent Laid-Open Publication No. Hei 2-62796 discloses a booster in which inverters are connected in series. FIG. 3 is a circuit diagram showing the booster disclosed in this publication.

In the booster of the publication as well, a plurality of transistors Tr110, Tr111, Tr112, Tr113, Tr114, and the like are connected in series, and a source voltage is supplied to the gate and source of the transistor Tr110. Also, capacitors C111, C112, C113, C114, and the like each have a terminal connected to each of the nodes. Each of the nodes is provided between the adjacent transistors. Inverters IV111, IV112, IV113, IV114, and the like are connected to the other terminals of the capacitors. Here, the inverters IV111, IV112, IV113, IV114, and the like are connected in series, and a clock signal CLK is inputted to the inverter IV111 on the first stage. Therefore, a signal in opposite phase with the clock signal CLK is inputted to the transistors Tr111, Tr113, and the like, and a signal in phase with the clock signal CLK is inputted to the transistors Tr112, Tr114, and the like. Hence, the inverters IV111, IV113, and the like are simultaneously driven and the inverters IV112, IV114, and the like are simultaneously driven. However, the inverters connected in series cause delay of a clock signal, so that the transistors are gradually shifted from one another in operational timing. Additionally, the clock signal CLK in FIG. 3 corresponds to the clock signal CLK shown in FIG. 1.

However, in the conventional charge pump shown in FIG. 2, about a half of the transistors are driven by one clock signal, so that a clock driver handles heavy load. A large number of clock drivers are simultaneously operated, resulting in an extremely high peak of source current on the rising of a clock signal. Namely, when source current has an extremely high peak, electricity supplied to the voltage regulator 108 rapidly increases at the moment and electricity supplied to the other circuits rapidly decreases. Although the security circuit 110 can detect a relatively mild reduction in electricity to prevent malfunction of the other circuits, the security circuit 110 cannot detect the above rapid reduction to suspend the operation of the circuit such as the CPU 103. For this reason, in the case of a high peak of source current, malfunction is likely to occur in the CPU 103 and the like.

Meanwhile, in the conventional booster shown in FIG. 3, the inverters IV 111 and the like are connected with delays and driving function. Hence, when the delay is reduced by shortening a clock period to shorten boosting time, current of the following stage is superposed to that of the previous stage. Consequently, the amount of current increases with later stages. Thus, a peak of current cannot be sufficiently reduced and is increased with the number of stages.

Furthermore, Japanese Patent Laid-Open Publication No. Hei 11-164545 discloses a charge pump in which a plurality of charge pump stages are provided and are shifted from one another in operation. Although a current peak is smaller than that of the precedent applications, the reduction is not sufficient. Moreover, a high period coincides with that of a clock signal on the following stage, so that charging and discharging times cannot be sufficiently obtained, resulting in lower booster efficiency.

SUMMARY OF THE INVENTION

An object of the present invention is to provide a booster being capable of preventing malfunction of other circuits in a non-contact IC card by reducing a current peak, an IC card having the same, and electronic equipment having the same.

According to the present invention, a booster comprises first to k-th (k is an even number) transistors connected to one another in series, first to k-th capacitors each having an end connected to the gate and source of each of the first to k-th transistors, and a clock driver which supplies clock signals out of phase with one another to the other ends of the first to k-th capacitors. The clock driver simultaneously supplies low-level clock signals to two or more adjacent capacitors out of the first to k-th capacitors.

In the present invention, the clock driver simultaneously supplies low-level clock signals to the two or more adjacent capacitors, so that two or more low-level nodes exist on the following stage and later of the transistor connected to the capacitor receiving a high-level clock signal. Therefore, for example, assuming that the transistor transmits ten charges to the node on the following stage, the transistor being connected to the capacitor where a high-level clock signal is supplied, the transmission of the ten charges turns on the transistor on the following stage and some of the ten charges are transmitted to a node on the still following stage. As a result, each of the nodes quickly increases in potential, adverse effect such as backflow of a current is immediately prevented, and boosting efficiency is improved.

In the clock driver in the present invention, when the first to k-th capacitors are divided from the first capacitor into groups, each constituted by n capacitors (n is a submultiple of k), clock signals with n phases may be supplied to the first to n-th capacitors, in the clock signals with n phases, high periods do not overlap one another and the rising timings are shifted in order of the first to n-th capacitors, and clock signals with n phases may be supplied to each of the other groups. The clock signals are delayed by a fixed amount from the above n-phase clock signals.

In this case, to the first to n-th capacitors, the clock signals with n phases are supplied in which high periods do not overlap one another and the rising timings are shifted in order of the first to n-th capacitors. Hence, regarding the transistors connected to such capacitors, the gate and source of the transistor increase in potential when a transistor on the previous stage is turned on. Thereafter, such an increase in potential is repeated in the (n+1)-th to k-th transistors. Consequently, the clock signals with k phases are different from one another in phase, so that charging and discharging times can be sufficiently obtained for each of the nodes and boosting efficiency can be improved. Further, the clock signals are shifted from one another in rising timing, so that it is possible to reduce a current peak and prevent malfunction of the other circuits that is caused by a current peak.

Additionally, for example, in the case of application for a non-contact IC card or the like, it is possible to prevent malfunction in the other circuits that is caused by a current peak.

BRIEF DESCRIPTION OF THE DRAWINGS

FIG. 11 is a timing chart showing variations of the clock signals CLK1 to CLK8 and source current in the first embodiment.

DETAILED DESCRIPTION OF THE PREFERRED EMBODIMENT

Figure 1:
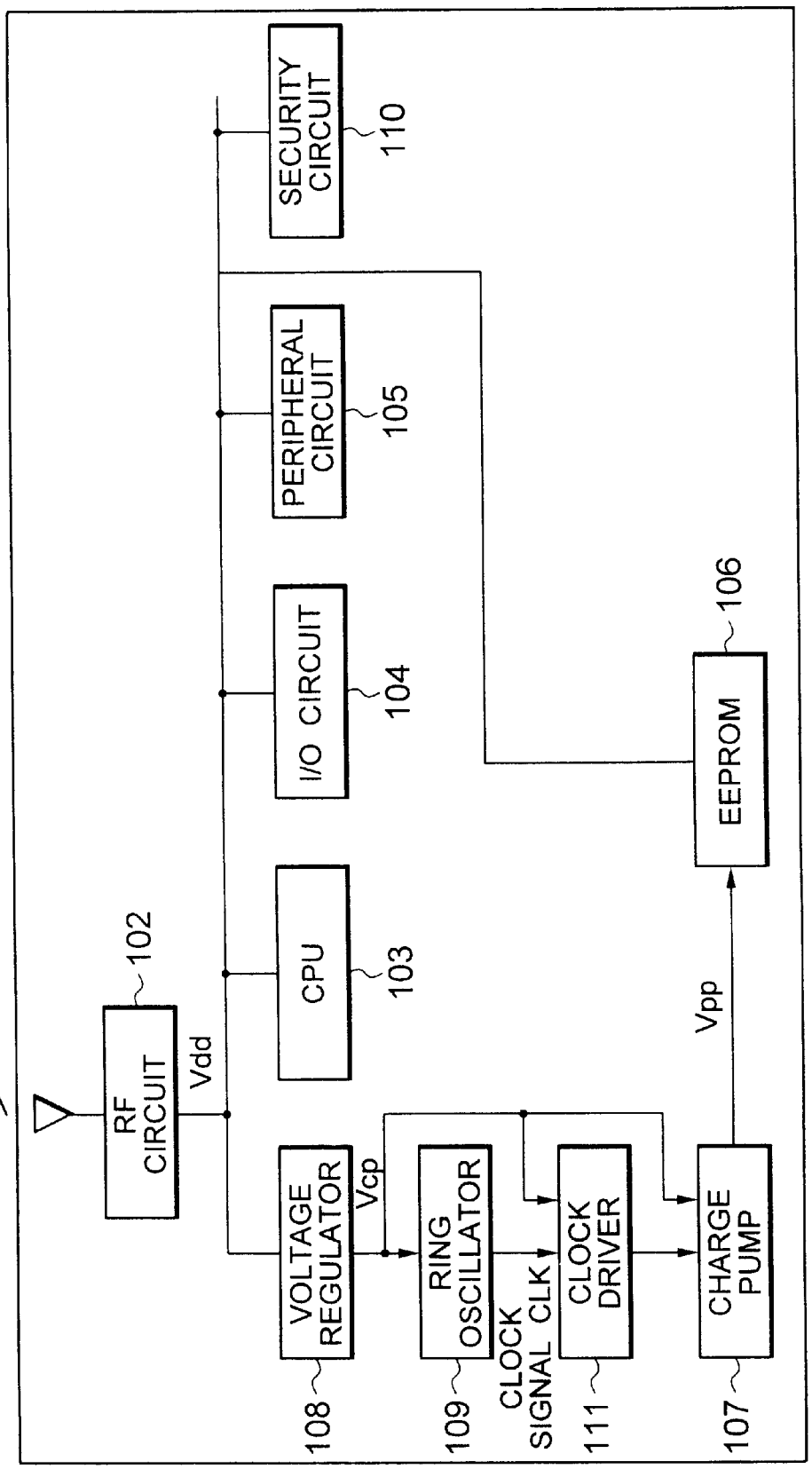
FIG. 1 is a schematic diagram showing the relationship of voltages supplied to circuits in a non-contact IC card.
Figure 2:
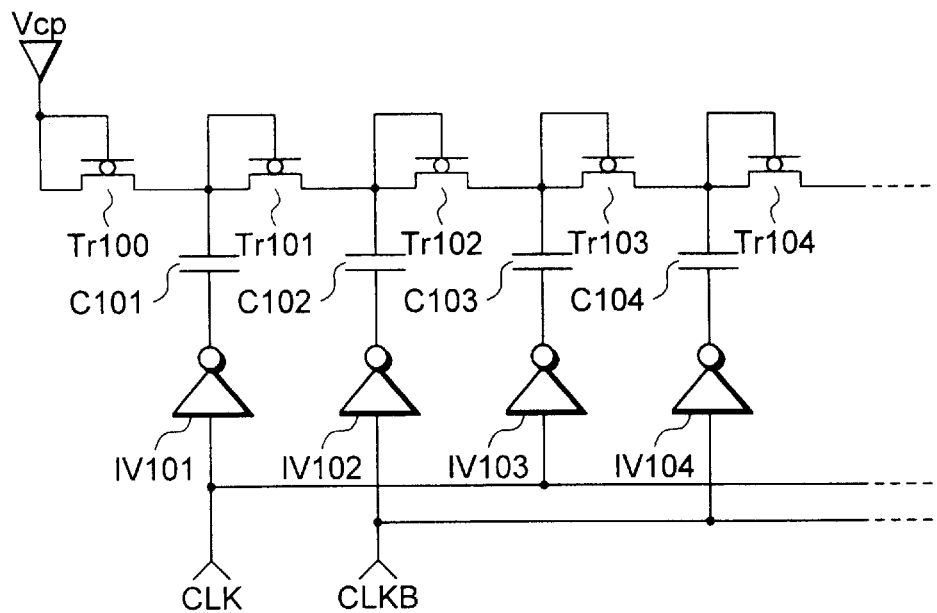
FIG. 2 is a circuit diagram showing an example of a conventional charge pump.
Figure 3:
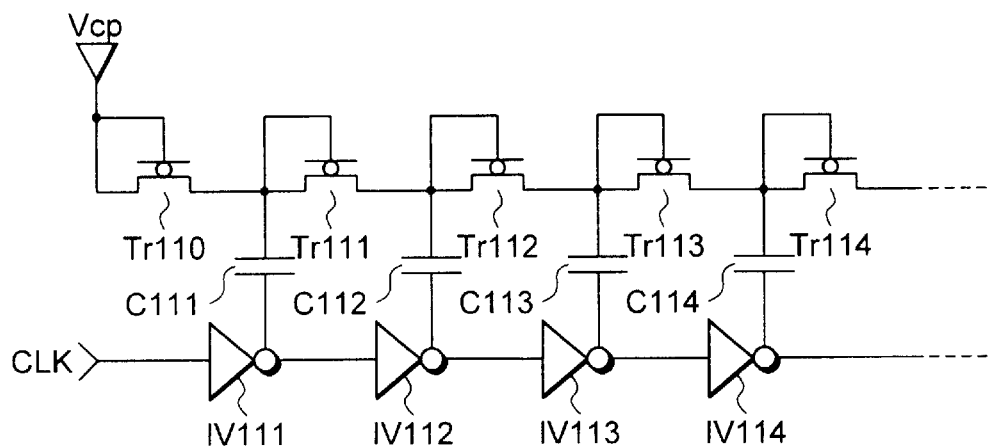
FIG. 3 is a circuit diagram showing a booster disclosed in Japanese Patent Laid-Open Publication No. Hei. 2-62796.
Figure 4:
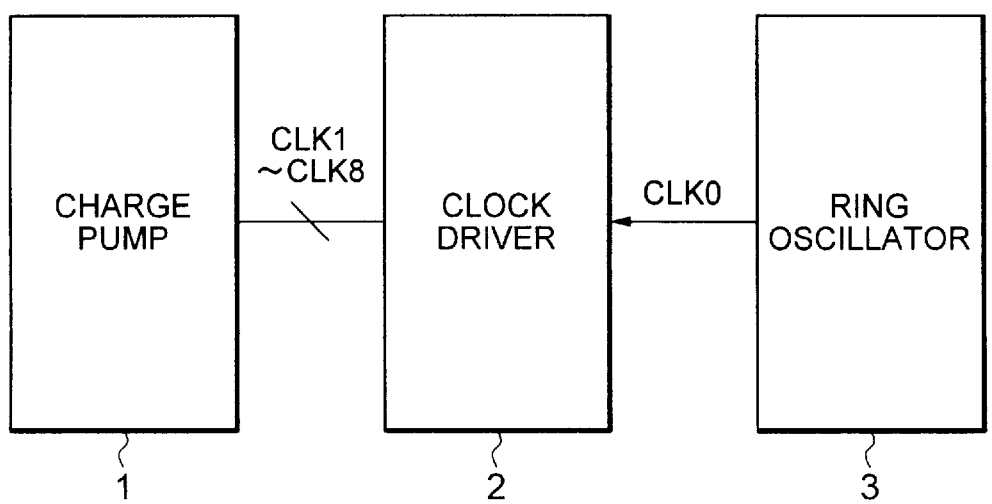
FIG. 4 is a block diagram showing the configuration of a booster according to a first embodiment of the present invention.
Figure 5:
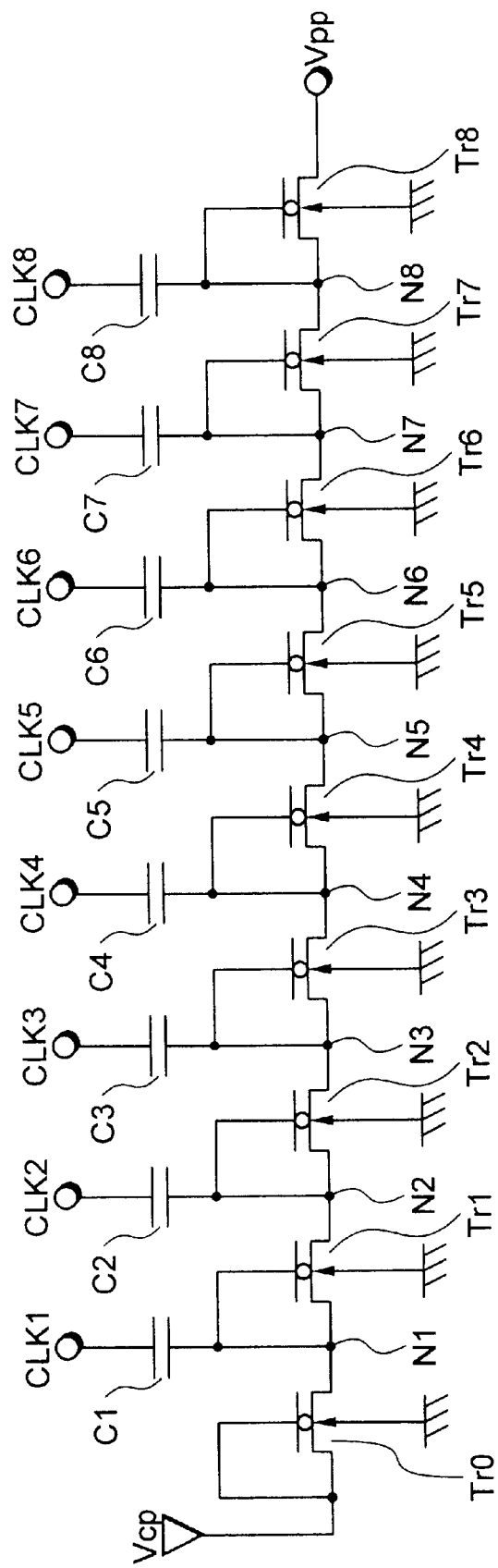
FIG. 5 is a circuit diagram showing the configuration of a charge pump in the first embodiment.
Figure 6:
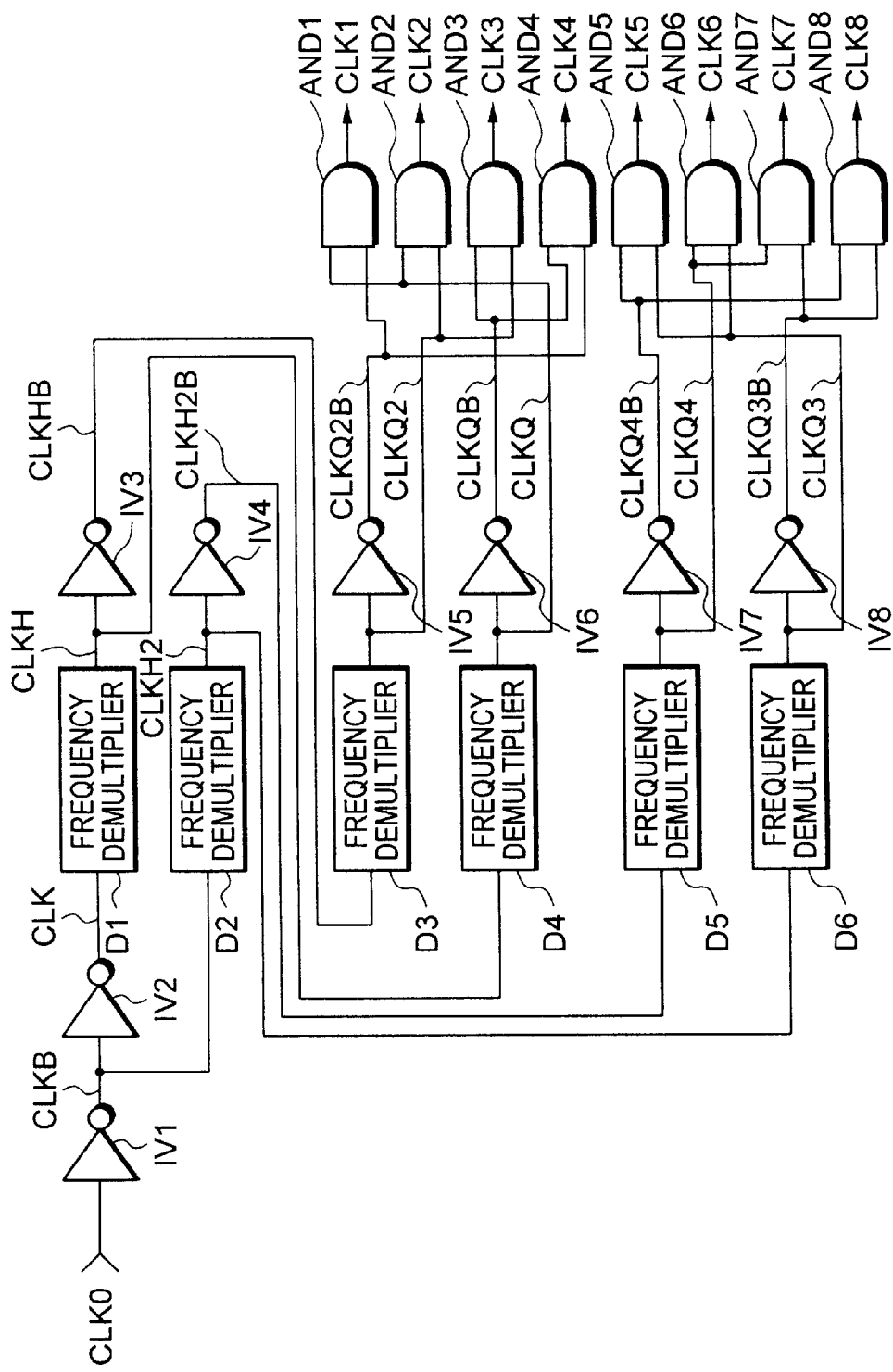
FIG. 6 is a block diagram showing the configuration of a clock driver in the first embodiment.
Figure 7:
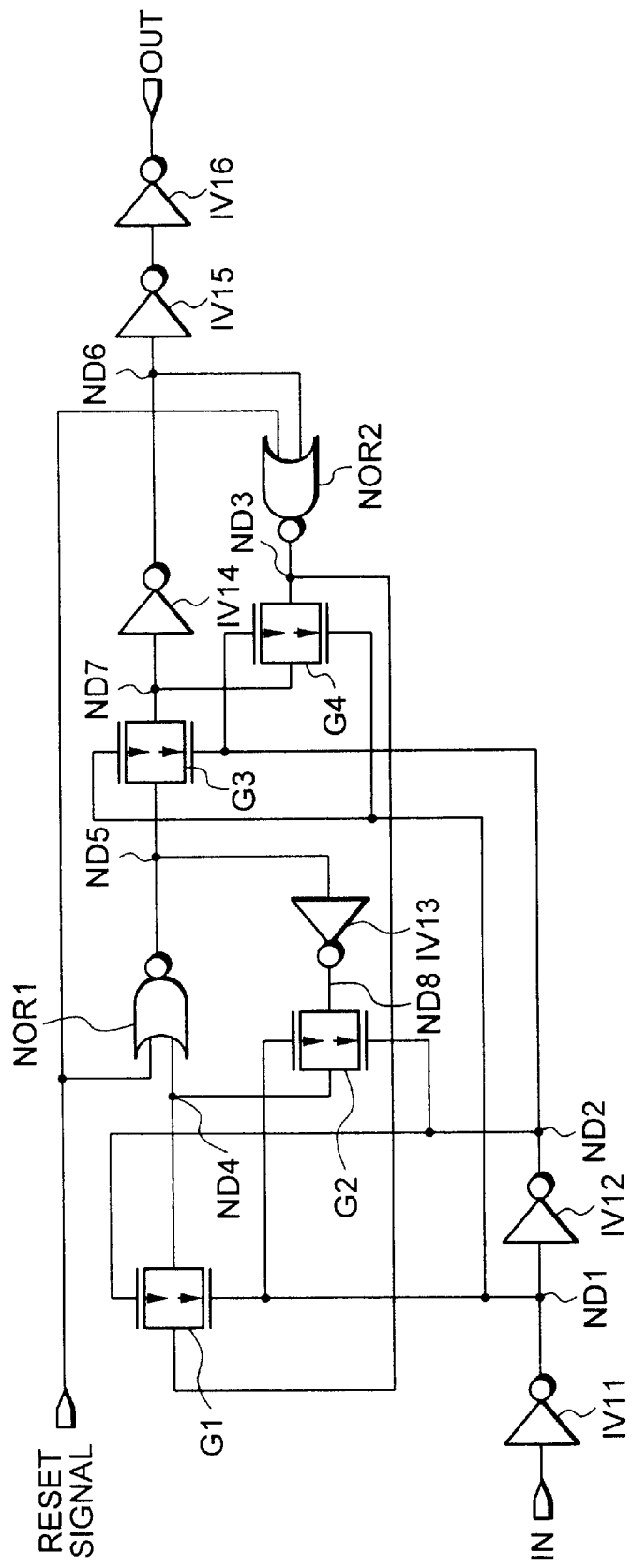
FIG. 7 is a block diagram showing the configuration of a frequency demultiplier.

The embodiments of the present invention will be described specifically, with reference to the accompanying drawings. The first embodiment relates to a charge pump used for the non-contact IC card shown in FIG. 1. FIG. 4 is a block diagram showing the configuration of a booster according to the first embodiment of the present invention. FIG. 5 is a circuit diagram showing the configuration of the charge pump in the first embodiment. FIG. 6 is a block diagram showing the configuration of a clock driver in the first embodiment. FIG. 7 is a block diagram showing the configuration of a frequency demultiplier.

The booster according to the first embodiment is provided with a charge pump 1, a clock driver (generator) 2 for supplying clock signals CLK1 to CLK8 with eight phases to the charge pump 1, and a ring oscillator 3 for supplying a clock signal CLK0 to the clock driver 2. The charge pump 1, the clock driver 2, and the ring oscillator 3 respectively correspond to the charge pump 107, the clock driver 111, and the ring oscillator 109 in FIG. 1. Additionally, in the first embodiment, the clock signal CLK0 corresponds to the clock CLK outputted from the ring oscillator 109 in the IC card shown in FIG. 1. The clock signal CLK0 may be another signal such as a CPU control clock signal and is not limited to an output signal of the ring oscillator.

In the charge pump 1, for example, nine N-channel transistors Tr0 to Tr8 are connected in series. The transistors Tr0 to Tr8 are, e.g., non-doped transistors. The transistor Tr0 on the first stage is provided for preventing backflow of a current and is diode-connected to power source, and a voltage for charge pump Vcp is supplied to the gate and source thereof. A voltage Vpp is outputted to an EEPROM from the drain of the transistor Tr8 on the final stage. Further, regarding capacitors C1 to C8, one terminal is respectively connected to nodes N1 to N8 each being provided between the adjacent transistors. The clock signals CLK1 to CLK8 are inputted to the other terminals of the capacitors C1 to C8. The capacitors C1 to C8 each have a capacity of, e.g., about 8 pF.

The clock driver 2 is provided with six frequency demultipliers D1 to D6 for dividing an inputted signal into halves.

Figure 8:
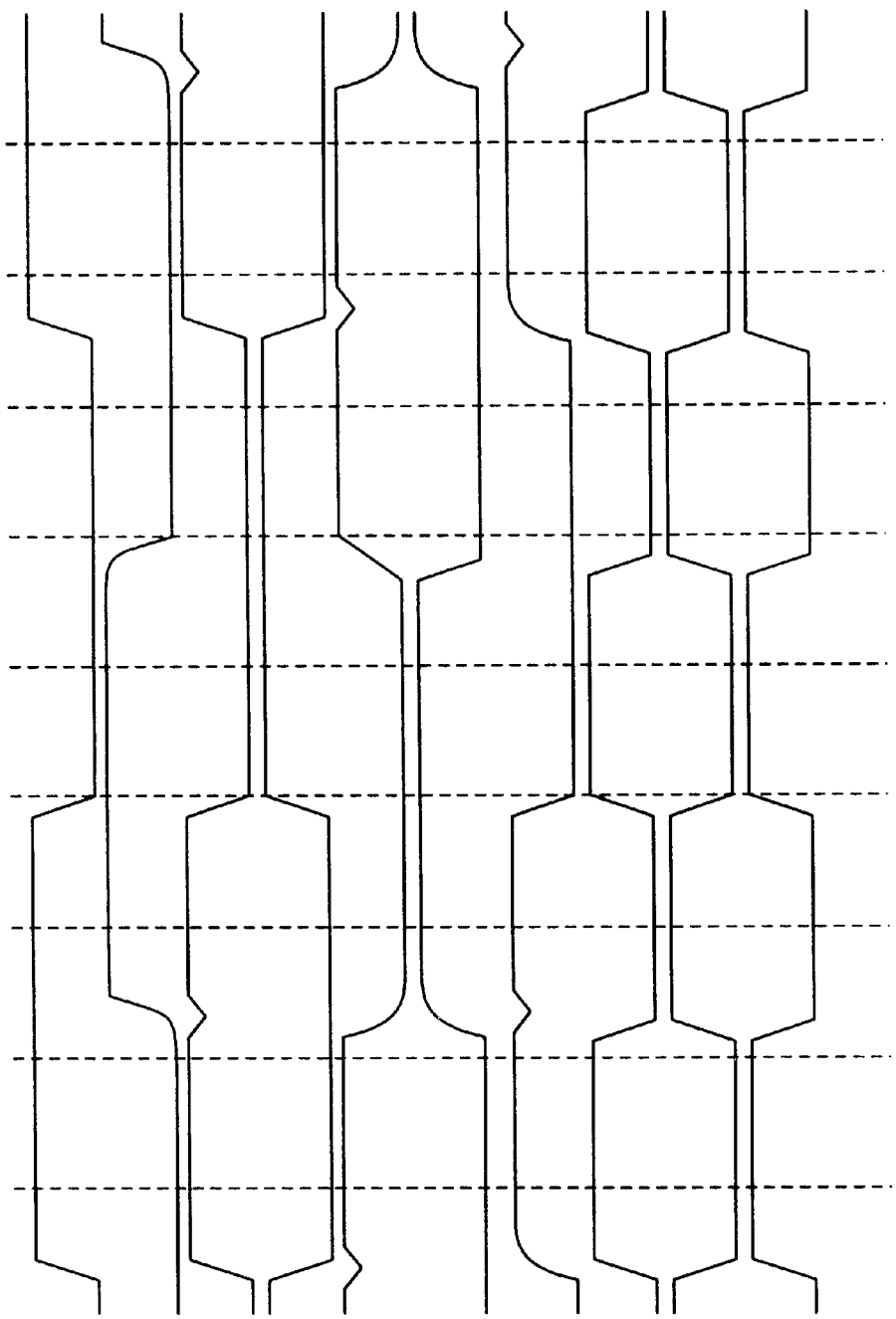
FIG. 8 is a timing chart showing the operation of the frequency demultiplier shown in FIG. 7.

The frequency demultipliers D1 to D6 have the configuration shown in FIG. 7. Namely, the frequency demultipliers D1 to D6 each include an inverter IV11 where an input signal IN is inputted, and an inverter IV12 for inverting an output signal of the inverter IV11. Moreover, NOR circuits NOR1 and NOR2 are provided for receiving a reset signal produced by a peripheral circuit such as the peripheral circuit 105 in FIG. 1. Inverters IV13 and IV14 are further provided for receiving an output signal of the NOR circuit NOR1. Here, a transfer gate G3 is provided between the NOR circuit NOR1 and the inverter IV14. An output signal of the NOR circuit NOR2 is inputted to an input terminal of the NOR circuit NOR1 via a transfer gate G1, and an output signal of the inverter IV13 is inputted to the input terminal of the NOR circuit NOR1 via a transfer gate G2. Additionally, an output signal of the NOR circuit NOR2 is inputted to the inverter IV14 via a transfer gate G4. The inverters IV15 and IV16 are connected in series to the inverter IV14, and an output signal of the inverter IV16 acts as an output signal of the frequency demultiplier. The transfer gates G1 to G4 are switched by output signals of the inverter IV11 and IV12. FIG. 8 is a timing chart showing the operation of the frequency demultiplier shown in FIG. 7.

Additionally, in the frequency demultipliers D1 to D6, the reset signal is, e.g., a signal for controlling a writing operation that is transmitted to the EEPROM. When the reset signal is high, output signals of the NOR circuits NOR1 and NOR2 are low, so that a dividing operation is suspended, thereby suspending a boosting operation of the charge pump 1.

Also, in the clock driver 2, an inverter IV1 is connected between the frequency demultiplier D2 and an input terminal where the clock signal CLK0 is inputted. An inverted signal CLKB of the clock signal CLK0 is inputted to the frequency demultiplier D2. Moreover, an inverter IV2 is connected between the inverter IV1 and the frequency demultiplier D1, and a signal CLK in phase with the clock signal CLK0 is inputted to the frequency demultiplier D1.

An output signal CLKH of the frequency demultiplier D1 is inputted to the frequency demultiplier D4. Further, an inverter IV3 is connected between the frequency demultipliers D1 and D3, and an inverted signal CLKHB of an output signal CLKH is inputted to the frequency demultiplier D3.

Meanwhile, an output signal CLKH2 of the frequency demultiplier D2 is inputted to the frequency demultiplier D6. Moreover, an inverter IV4 is connected between the frequency demultipliers D2 and D5, an inverted signal CLKH2B of the output signal CLKH2 is inputted to the frequency demultiplier D5.

Furthermore, there are provided: an inverter IV5 for inverting an output signal CLKQ2 of the frequency demultiplier D3 and outputting an inverted signal CLKQ2B, an inverter IV6 for inverting an output signal CLKQ of the frequency demultiplier D4 and outputting an inverted signal CLKQB, an inverter IV7 for inverting an output signal CLKQ4 of the frequency demultiplier D5 and outputting an inverted signal CLKQ4B, and an inverter IV8 for inverting an output signal CLKQ3 of the frequency demultiplier D6 and outputting an inverted signal CLKQ3B.

Still more, there are provided: an AND-circuit AND1 for obtaining a logical multiplication of the signal CLKQ2B and the signal CLKQ, an AND-circuit AND2 for obtaining a logical multiplication of the signal CLKQ and the signal CLKQ2, an AND-circuit AND3 for obtaining a logical multiplication of the signal CLKQB and the signal CLKQ2, an AND-circuit AND4 for obtaining a logical multiplication of the signal CLKQB and the signal CLKQ2B, an AND-circuit AND5 for obtaining a logical multiplication of the signal CLKQ4B and the signal CLKQ3, an AND-circuit AND6 for obtaining a logical multiplication of the signal CLKQ4 and the signal CLKQ3, an AND-circuit AND7 for obtaining a logical multiplication of the signal CLKQ4 and the signal CLKQ3B, and an AND-circuit AND8 for obtaining a logical multiplication of the signal CLKQ4B and the signal CLKQ3B. And then, output signals of the AND-circuits AND1 to AND8 respectively act as the clock signals CLK1 to CLK8.

Figure 9:
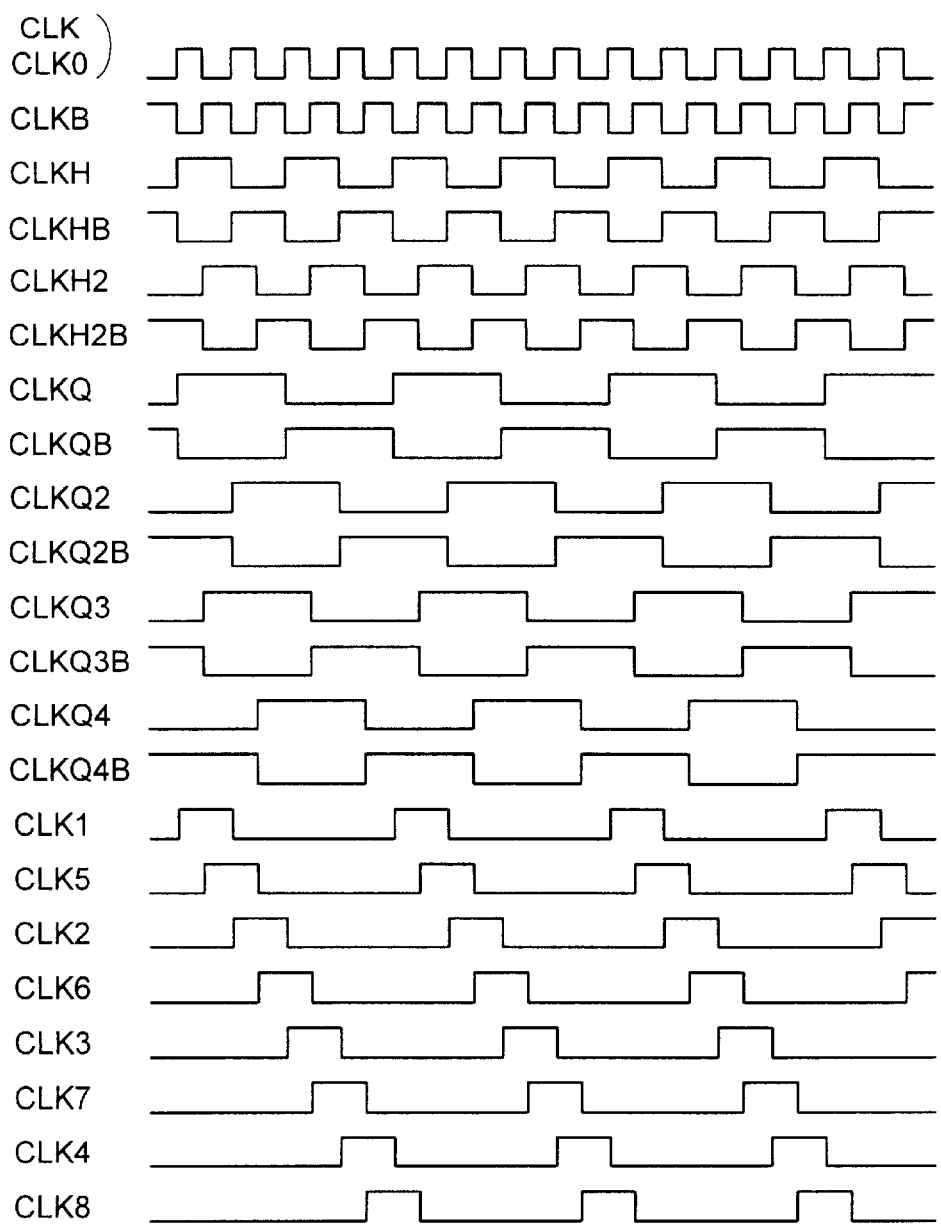
FIG. 9 is a timing chart showing variations of signals in a clock driver 2.

FIG. 9 is a timing chart showing variations of the signals in the clock driver 2. As shown in FIG. 9, the clock signals CLK1 to CLK4 are produced by dividing the clock signal CLK0, which is used for a CPU and the like in the non-contact IC card, such that high periods do not overlap one another. The clock signals CLK5 to CLK8 are respectively produced by delaying the clock signals CLK1 to CLK4 by a half period of the clock signal CLK0.

Figure 10A:
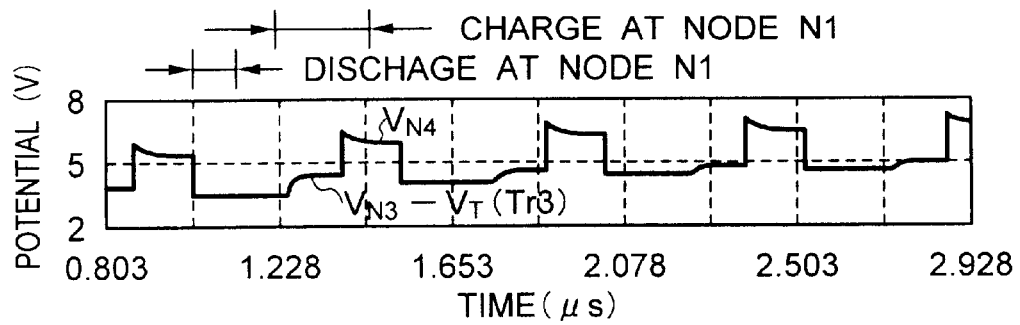
FIGS. 10A to 10D are graphs showing variations in potential of nodes N4, N3, N2, and N1 in the first embodiment, respectively.
Figure 10B:
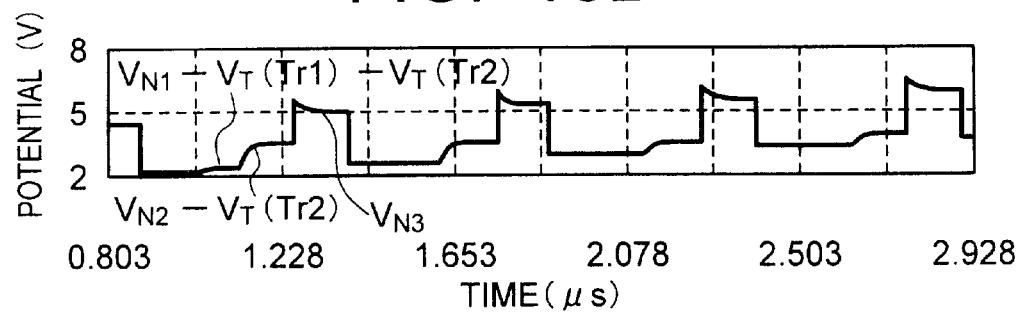
Figure 10C:
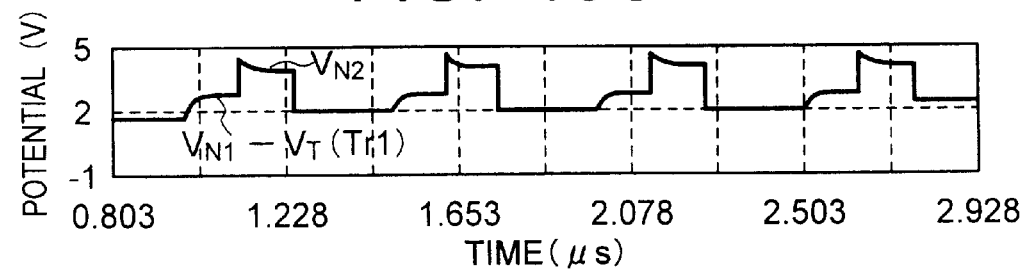
Figure 10D:
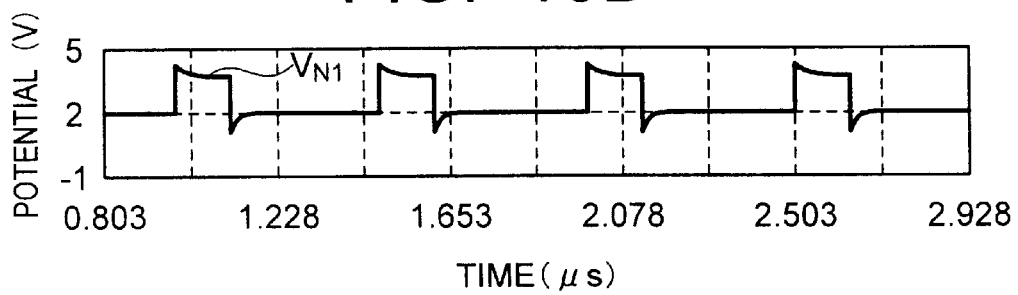
Figure 10E:
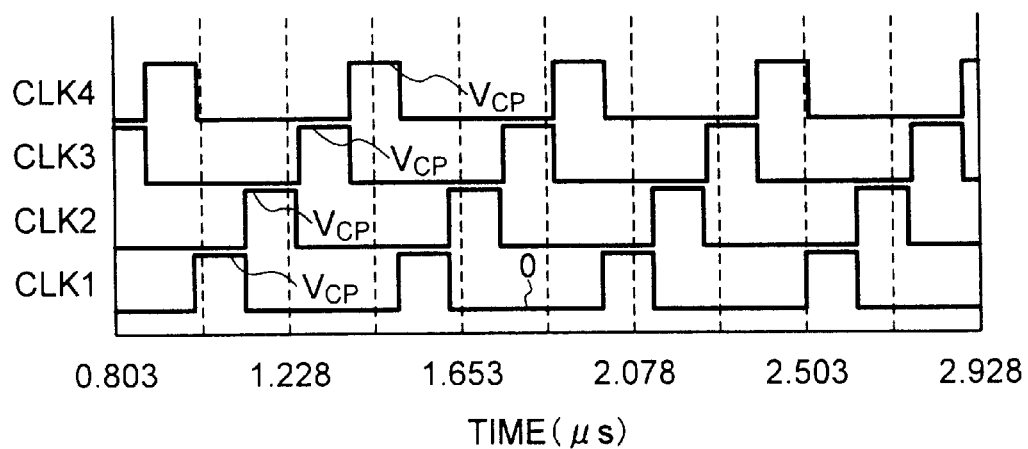
FIG. 10E is a timing chart showing variations of clock signals CLK1 to CLK4 that correspond to FIGS. 10A to 10D.

The following will discuss the operation of the first embodiment configured as above. FIGS. 10A to 10D are graphs respectively showing variations in potential of nodes N4, N3, N2, and N1. FIG. 10E is a timing chart showing variations of the clock signals CLK1 to CLK4 that correspond to FIGS. 10A to 10D.

When the clock signal CLK1 rises, a potential of the node N1 is instantly increased, and then the node N1 is discharged. The potential is denoted as $V_{N1}$. Meanwhile, upon discharging the node N1, the transistor Tr1 is turned on and the node N2 is charged, and the transistor Tr2 is turned on and the node N3 is somewhat charged. However, a potential of the node N3 is not increased to such an extent that the transistor Tr3 is turned on, so that the node N4 does not change in potential. When threshold voltages of the transistors Tr1 and Tr2 are respectively denoted as $V_T(Tr1)$ and $V_T(Tr2)$, a potential of the node N2 is "$V_{N1}-V_T(Tr1)$" and a potential of the node N3 is "$V_{N1}-V_T(Tr1)-V_T(Tr2)$".

Next, when the clock signal CLK2 rises while the clock signal CLK1 falls, a potential of the node N2 is instantly increased, and then the node N2 is discharged. A potential of the node N2 is further raised from an increase of the previous timing, so that the potential is higher than the increased potential of the node N1. Moreover, the node N3 is further charged in the same manner as the time when the clock signal CLK1 rises, and the potential is "$V_{N2}-V_T(Tr2)$". Accordingly, the transistor Tr3 is turned on and the node N4 is somewhat charged. When a threshold voltage of the transistor Tr3 is denoted as $V_T(Tr3)$, a potential of the node N4 is "$V_{N2}-V_T(Tr2)-V_T(Tr3)$". Meanwhile, regarding the node N1, the transistor Tr0 is diode-connected to power source, so that the node N1 is charged and a potential thereof is "$Vcp-V_T(Tr0)$". Here, $V_T(Tr0)$ is a threshold voltage of the transistor Tr0.

Subsequently, when the clock signal CLK3 rises while the clock signal CLK2 falls, a potential of the node N3 is instantly increased, and then the node N3 is discharged. A potential of the node N3 is further raised from an increase of the previous two timings, so that the potential is higher than the increased potential of the node N2. Furthermore, the node N4 is further charged in the same manner as the time when the clock signal CLK2 rises, and the potential is "$V_{N3}-V_T(Tr3)$". Moreover, charging starts for the node N2.

Next, when the clock signal CLK4 rises while the clock signal CLK3 falls, a potential of the node N4 is instantly increased, and then the node N4 is discharged. A potential of the node N4 is further raised from an increase of the previous two timings, so that the potential is higher than the increased potential of the node N3. Further, charging starts for the node N3.

Thereafter, when the clock signal CLK1 rises while the clock signal CLK4 falls, the foregoing steps are repeated between the transistors Tr1 to Tr4. As described above, a potential of a node Nk+1 is increased to $V_{Nk}-V_T(Trk)$ by charging.

Also, regarding the transistors Tr5 to Tr8, after a half period of the clock signal CLK0 since the clock signal CLK4 falls, the clock signal CLK5 rises. And then, the clock signals CLK5 to CLK8 are respectively produced by delaying the clock signals CLK1 to CLK4, so that the foregoing steps are carried out and a voltage Vpp is outputted from the drain of the transistor Tr8. The voltage Vpp is boosted from a voltage for charge pump Vcp.

Additionally, the foregoing operation is conducted after a lapse of about 1 to 1.5 µs from the start of the operation. The nodes N2 to N8 increase in potential with the passage of time. Thus, for example, a degree of increase in potential of the node N3 when the node N1 increases in potential is reduced with the passage of time and the increase sometime converges to 0 at last.

As earlier mentioned, according to the first embodiment, each of the nodes increases in potential when the transistor on the previous stage is turned on, and each of the nodes further increases in potential when the corresponding clock signal rises. Hence, it is possible to boost a voltage for charge pump Vcp.

FIG. 11 is a timing chart showing variations of the clock signals CLK1 to CLK8 and source current in the first embodiment. As shown in FIG. 11, all the transistors are shifted in rising timing, so that a peak of source current is low. For this reason, a voltage supplied to the voltage regulator is not rapidly increased so as to prevent malfunction of other circuits such as the CPU when the present embodiment is applied for a non-contact IC card.

Furthermore, as for the clock driver 2 for driving the transistors provided in the first embodiment, one clock signal may be used for driving a single transistor, so that the load of the clock driver 2 is dramatically reduced.

Still more, each of the nodes increases in potential before rising of a clock signal corresponding to the node, i.e., a long charging period is provided, so that high charging efficiency is achieved.

Figure 12:
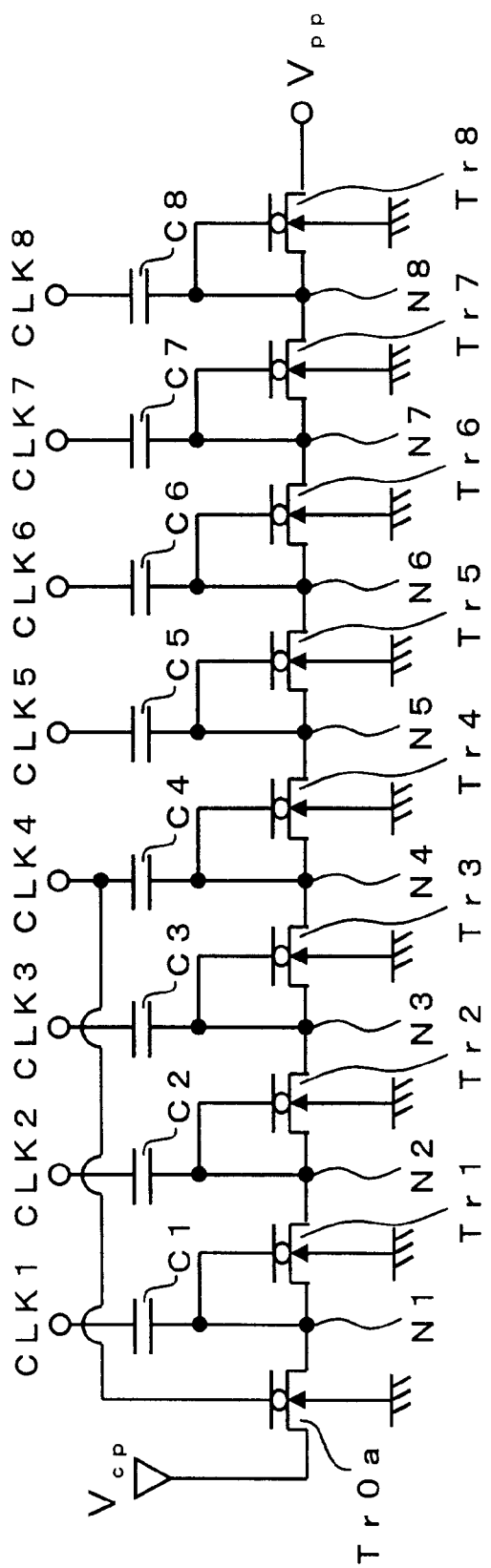
FIG. 12 is a circuit diagram showing the configuration of a charge pump in a booster according to a second embodiment of the present invention.

The following will discuss the second embodiment of the present invention. The second embodiment is different from the first embodiment in configuration of a charge pump. FIG. 12 is a circuit diagram showing the configuration of a charge pump in a booster according to the second embodiment of the present invention. Here, regarding the charge pump according to the second embodiment in FIG. 12, the same members as those of the charge pump in the first embodiment in FIG. 5 are indicated by the same reference numerals and the detailed description thereof is omitted.

In the second embodiment, a transistor Tr0a on the first stage of the charge pump is not diode-connected and the clock signal CLK4 is inputted to the gate of the transistor Tr0a. Other configurations such as a clock driver 2 are identical to those of the first embodiment.

Figure 13A:
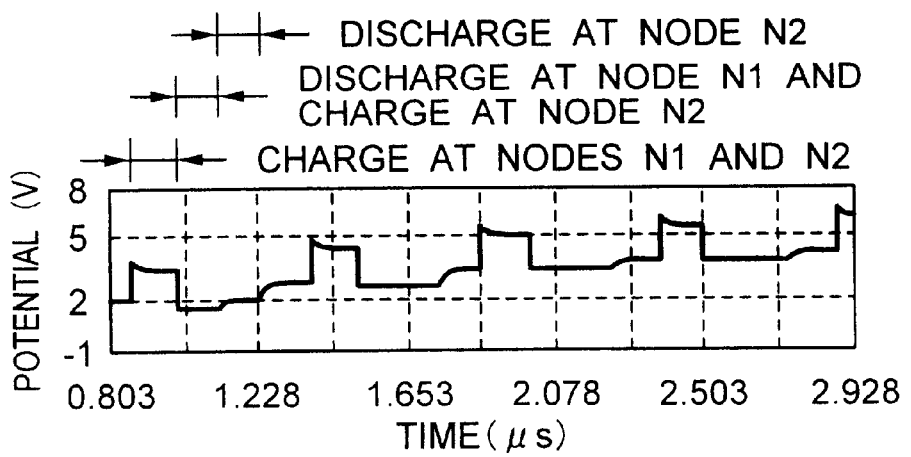
FIGS. 13A to 13D are graphs showing variations in potential of nodes N4, N3, N2, and N1 in the second embodiment, respectively.
Figure 13B:
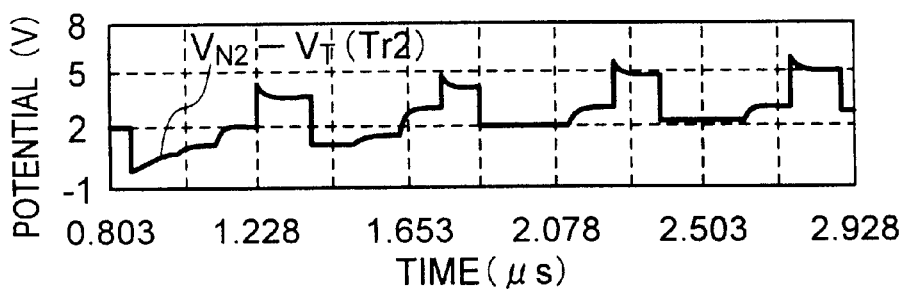
Figure 13C:
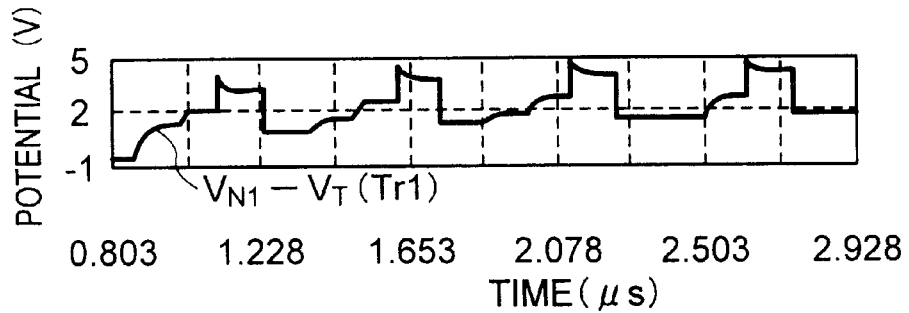
Figure 13D:
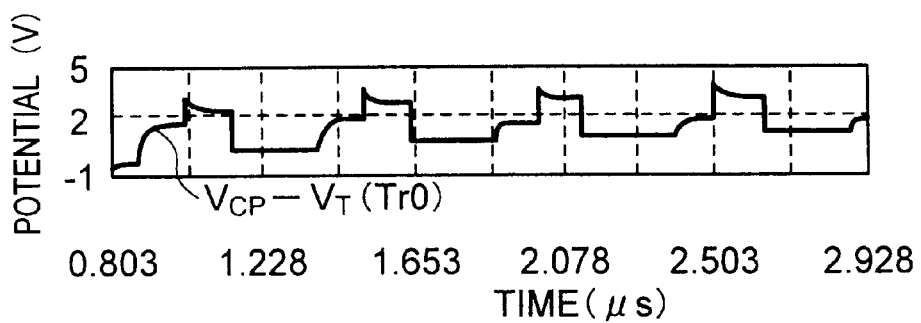
Figure 13E:
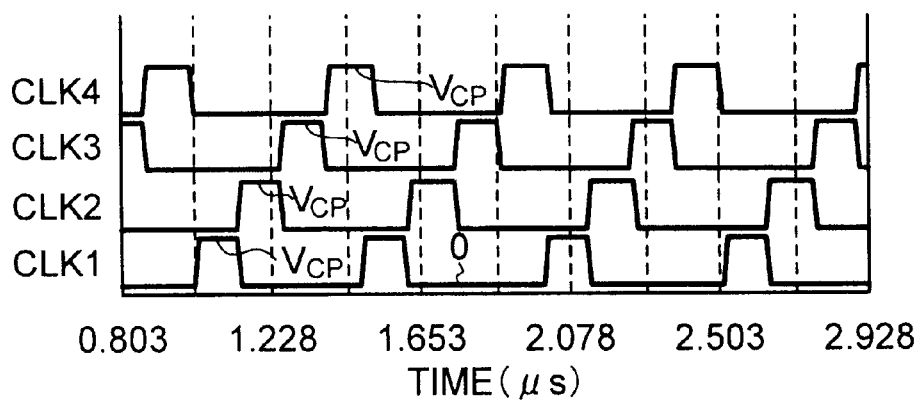
FIG. 13E is a timing chart showing variations of clock signals CLK1 to CLK4 that correspond to FIGS. 13A to 13D.

Next, the following will discuss the operation of the second embodiment. FIGS. 13A to 13D are graphs respectively showing variations in potential of nodes N4, N3, N2, and N1 in the second embodiment. FIG. 13E is a timing chart showing variations of clock signals CLK1 to CLK4 corresponding to FIGS. 13A to 13D.

When the clock signal CLK1 rises, a potential of the node N1 instantly increases, and then the node N1 is discharged. Meanwhile, upon discharging the node N1, in the same manner as the first embodiment, the transistor Tr1 is turned on and the node N2 is charged, and the transistor Tr2 is turned on and the node N3 is somewhat charged. However, the transistor Tr3 remains turned off and the node N4 does not change in potential.

Next, when the clock signal CLK2 rises while the clock signal CLK1 falls, a potential of the node N2 is instantly increased, and then the node N2 is discharged. An increase in potential of the node N2 is further raised from an increase of the previous timing, so that the potential is higher than the increased potential of the node N1. Furthermore, the node N3 is further charged in the same manner as the time when the clock signal CLK1 rises. Accordingly, the transistor Tr3 is turned on and the node N4 is somewhat charged. Meanwhile, as for a potential of the node N1, unlike the first embodiment, the clock signal CLK4 is supplied to the gate of the transistor Tr0a. Hence, at this moment, the clock signal CLK4 is low and the transistor Tr0 is turned off, so that the node N1 has a potential of about 0V.

Subsequently, when the clock signal CLK3 rises while the clock signal CLK2 falls, a potential of the node N3 is instantly increases, and then the node N4 is discharged. A potential of the node N3 is further raised from an increase of the previous two timings, so that the potential is higher than the increased potential of the node N2. Moreover, a potential of the node N4 is further charged more than that of the previous timings.

And then, when the clock signal CLK4 rises while the clock signal CLK3 falls, a potential of the node N4 is instantly increased, and then the node N4 is discharged. A potential of the node N4 is further raised from an increase of the previous two timings, so that the potential is higher than the increased potential of the node N3. Additionally, due to the rising of the clock signal CLK4, the transistor Tr0a on the first stage is turned on. Therefore, the node N1 is charged, and the nodes N2 and N3 increase in potential accordingly.

Thereafter, the clock signal CLK1 rises while the clock signal CLK4 falls. The foregoing steps are repeated between the transistors Tr1 to Tr4. As described above, in the second embodiment as well, a potential of a node Nk+1 is increased to $V_{Nk}-V_T(Trk)$ by charging.

Moreover, as for the transistors Tr5 to Tr8, the same operation as the first embodiment is carried out and a voltage Vpp, which is boosted from the voltage for charge pump Vcp is outputted from the drain of the transistor Tr8.

Additionally the foregoing operation is conducted after a lapse of about 1 to 1.5 $\mu$s from the start of the operation. The nodes N2 to N8 increase in potential with the passage of time. Thus, for example, an increase in potential of the node N3 when the node N1 increases in potential is reduced and the increase sometime converges to 0 at last.

As described above, the second embodiment also makes it possible to boost a voltage for charge pump Vcp. Further, all the transistors are shifted in rising timing, so that a peak of source current is low and malfunction can be prevented in other circuits such as a CPU. Furthermore, regarding the clock driver 2 as well, although the clock signal CLK4 is used for driving two transistors, the load is considerably reduced as compared with the prior art.

Also, in the second embodiment, when the clock signal CLK1 is high, a low-level clock signal is inputted to the gate of the transistor Tr0a. Therefore, even when the transistor Tr0a has a negative threshold voltage, although there is a limit, the transistor Tr0a is not turned on under normal conditions. Thus backflow of a current from the node N1 can be prevented.

Moreover, on the initial step of boosting in the second embodiment, while each of the clock signals CLK1 to CLK4 is brought high once, the node N1 is charged twice, resulting in shorter boosting time as compared with the first embodiment.

Figure 14:
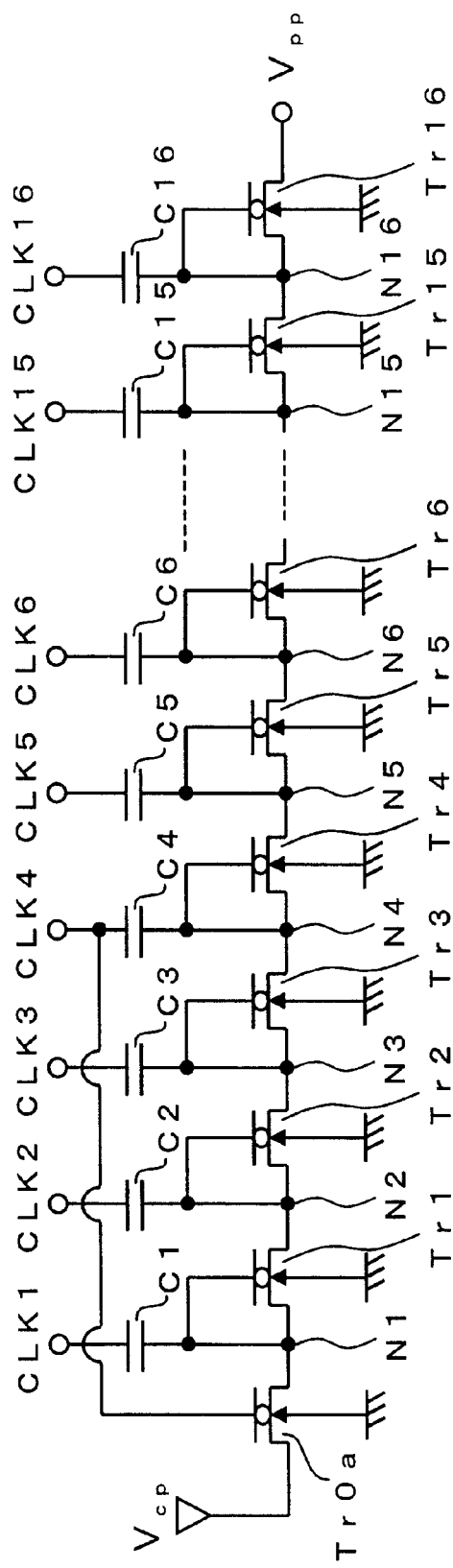
FIG. 14 is a circuit diagram showing the configuration of a charge pump in a third embodiment according to the present invention.
Figure 15A:
FIGS. 15A to 15P are diagrams showing AND-circuits provided in a clock driver in the third embodiment.
Figure 15B:
Figure 15C:
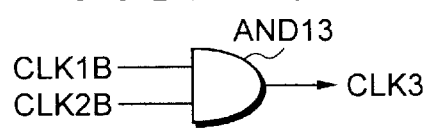
Figure 15D:
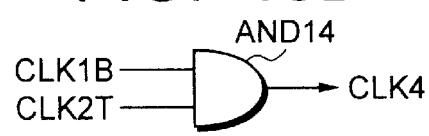
Figure 15E:
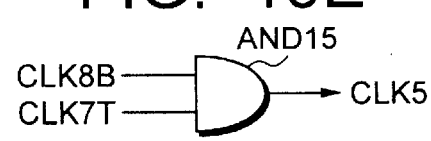
Figure 15F:
Figure 15G:
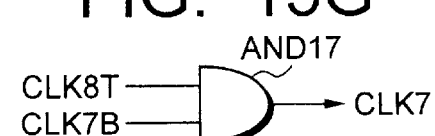
Figure 15H:
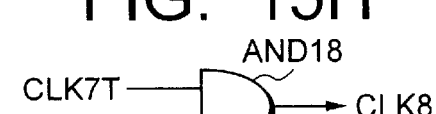
Figure 15I:
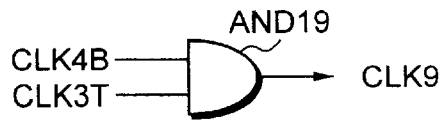
Figure 15J:
Figure 15K:
Figure 15L:
Figure 15M:
Figure 15N:
Figure 15O:
Figure 15P:

Additionally, although the clock signals CLK1 to CLK8 with eight phases are used in the first and second embodiments, the number of the clock signals is not particularly limited, and the number of transistors and capacitors used in a charge pump may be adjusted according to the number of the clock signals. FIG. 14 is a circuit diagram showing the configuration of a charge pump according to the third embodiment of the present invention, in which the second embodiment is used for clock signals with sixteen phases. FIGS. 15A to 15P show AND-circuits provided in a clock driver in the third embodiment. Further, FIG. 16 is a timing chart showing variations of signals in the third embodiment.

In the charge pump of the third embodiment, seventeen N-channel transistors Tr0 to Tr16 are connected in series. Moreover, capacitors C1 to C16 each have a terminal connected to each of nodes N1 to N16. Each of the nodes is provided between adjacent transistors. Clock signals CLK1 to CLK16 are inputted respectively to the other terminals of the capacitors C1 to C16.

Meanwhile, as shown in FIGS. 15A to 15P, the clock driver is provided with an AND-circuit 11 for obtaining a logical multiplication of the signals CLK1T and CLK2T, an AND-circuit 12 for obtaining a logical multiplication of the signals CLK2B and CLK1T, an AND-circuit 13 for obtaining a logical multiplication of the signals CLK1B and CLK2B, an AND-circuit 14 for obtaining a logical multiplication of the signals CLK1B and CLK2T, an AND-circuit for obtaining a logical multiplication of the signals CLK8B and CLK7T, an AND-circuit 16 for obtaining a logical multiplication of the signals CLK7B and CLK8B, an AND-circuit 17 for obtaining a logical multiplication of the signals CLK8T and CLK7B, an AND-circuit 18 for obtaining a logical multiplication of the signals CLK7T and CLK8T, an AND-circuit 19 for obtaining a logical multiplication of the signals CLK4B and CLK3T, an AND-circuit 20 for obtaining a logical multiplication of the signals CLK3B and CLK4B, an AND-circuit 21 for obtaining a logical multiplication of the signals CLK4T and CLK3B, an AND-circuit 22 for obtaining a logical multiplication of the signals CLK3T and CLK4T, an AND-circuit 23 for obtaining a logical multiplication of the signals CLK6B and CLK5T, an AND-circuit 24 for obtaining a logical multiplication of the signals CLK5B and CLK6B, an AND-circuit 25 for obtaining a logical multiplication of the signals CLK6T and CLK5B, and an AND-circuit 26 for obtaining a logical multiplication of the signals CLK5T and CLK6T.

Figure 16:
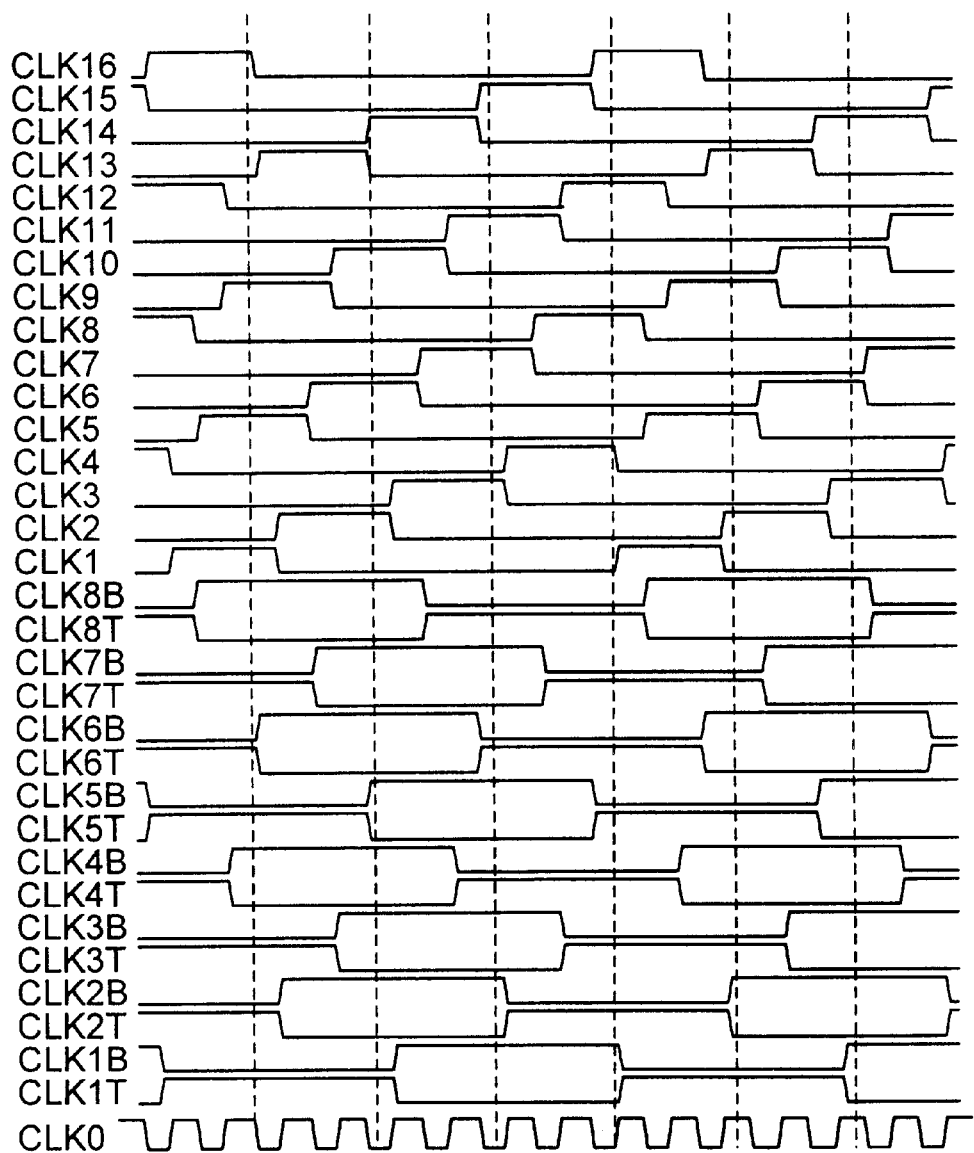
FIG. 16 is a timing chart showing variations of signals in the third embodiment.

Here, as shown in FIG. 16, the signal CLK8T is produced by dividing the clock signal CLK0 into four, and the signal CLK8B is an inverted signal of the signal CLK8T. The signal CLK7T is produced by delaying the signal CLK8T by two periods of the clock signal CLK0, and the signal CLK7B is an inverted signal of the signal CLK7T. The signal CLK6T is delayed by one period of the clock signal CLK0 from the signal CLK8T, and the signal CLK6B is an inverted signal of the signal CLK6T. The signal CLK5T is delayed by three periods of the clock signal CLK0 from the signal CLK8T, and the signal CLK5B is an inverted signal of the signal CLK5T.

Also, the signals CLK1T to CLK4T are respectively produced by delaying the signals CLK5T to CLK8T by a half period of the clock signal CLK0. The signals CLK1B to CLK4B are respectively produced by delaying the signals CLK5B to CLK8B by a half period of the clock signal CLK0.

Regarding clock signals outputted from the AND-circuits AND11 to AND26, the clock signals CLK1 to CLK4 are produced by dividing the clock signal CLK0 such that high periods do not overlap one another, the clock signals CLK5 to CLK8 are respectively produced by delaying the clock signals CLK1 to CLK4 by a half period of the clock signal CLK0, the clock signals CLK9 to CLK12 are produced by delaying the clock signals CLK1 to CLK4 by one period of the clock signal CLK0, and the clock signals CLK13 to CLK16 are respectively produced by delaying the clock signals CLK1 to CLK4 by three seconds of a period of the clock signal CLK0.

Therefore, in the third embodiment as well, any of the clock signals CLK1 to CLK16 do not rise simultaneously. For this reason, a peak of source current is low and the load of the clock driver is light.

Additionally, the third embodiment uses the second embodiment for the clock signals with sixteen phases. The first embodiment is also applicable to the clock signals with sixteen phases.

Figure 17:
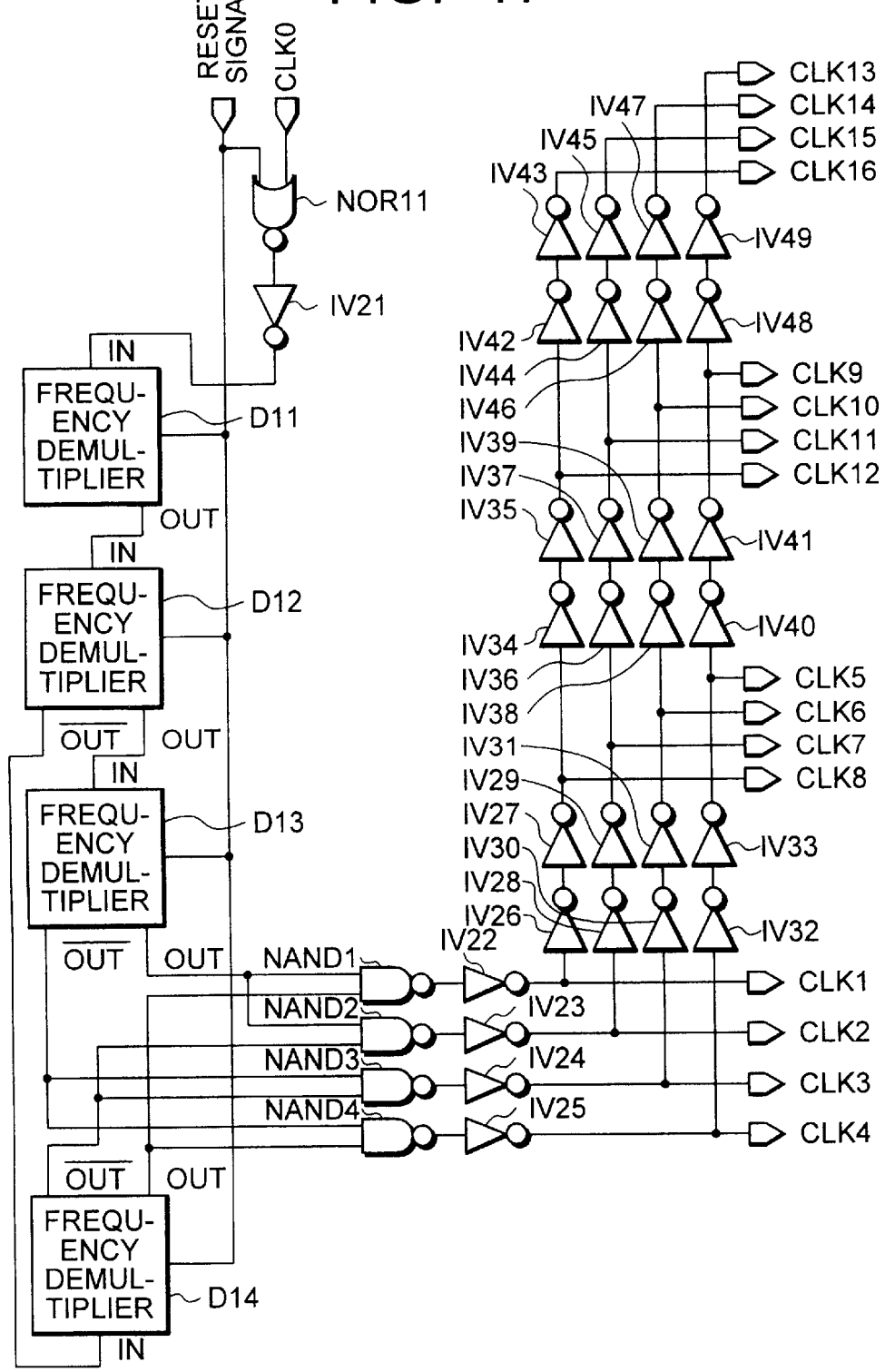
FIG. 17 is a block diagram showing the configuration of a first clock driver.
Figure 18:
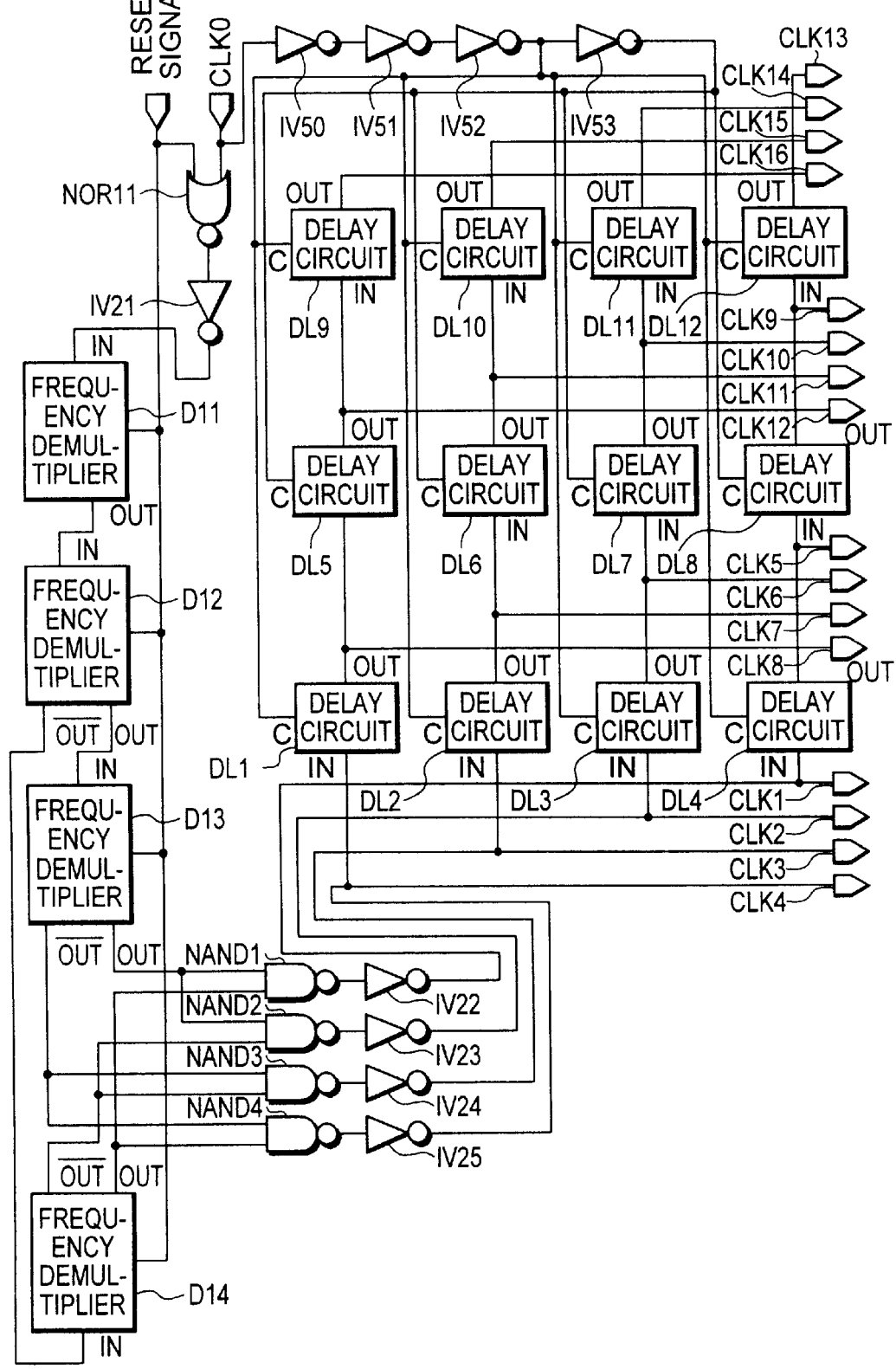
FIG. 18 is a block diagram showing the configuration of a second clock driver.
Figure 19:
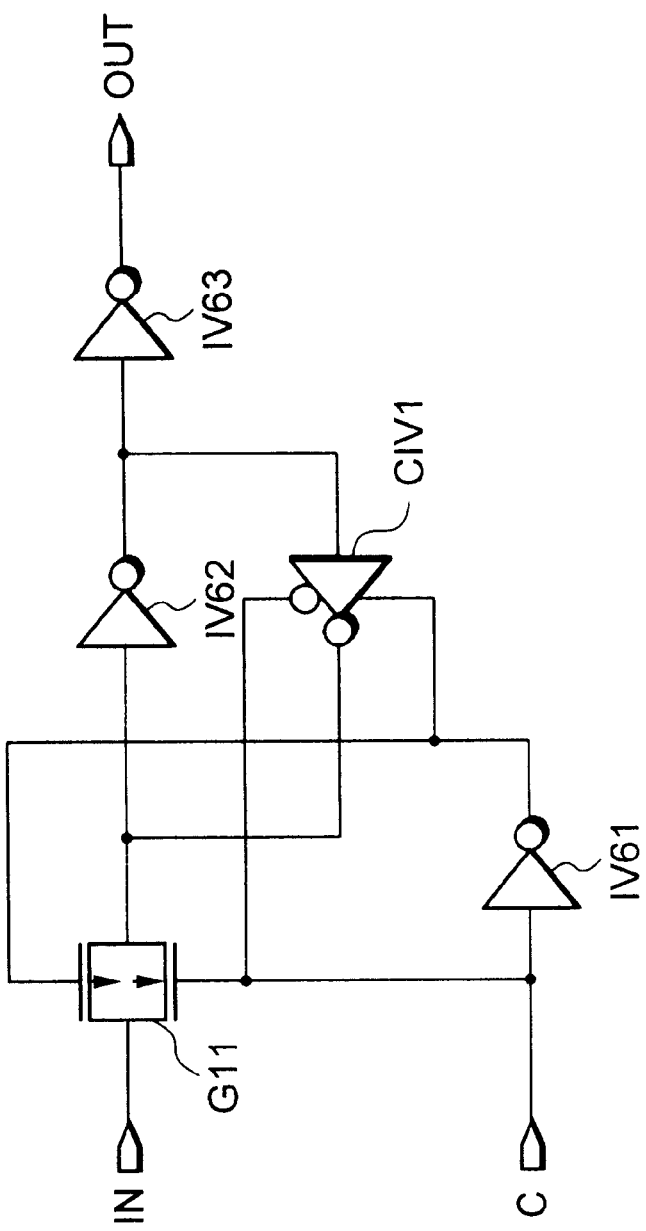
FIG. 19 is a circuit diagram showing the configuration of a delay circuit in the second clock driver shown in FIG. 18.

Moreover, the configuration of the clock driver is not limited to that of FIG. 6. In the case of producing clock signals with sixteen phases, a configuration such as FIG. 17 or FIG. 18 is also applicable. FIG. 17 is a block diagram showing the configuration of a first clock driver for producing clock signals with sixteen phases. FIG. 18 is a block diagram showing the configuration of a second clock driver for producing clock signals with sixteen phases. Moreover, FIG. 19 is a circuit diagram showing the configuration of a delay circuit in the second clock driver shown in FIG. 18.

The clock driver of FIG. 17 is provided with a NOR circuit NOR11 to which the clock signal CLK0 and a reset signal are inputted, and an inverter IV21 for inverting an output signal of the NOR circuit NOR11. Further, frequency demultipliers D11 to D14 configured as FIG. 7 are connected in series to the inverter IV21. There are further provided: a NAND-circuit NAND 1 for obtaining a non-conjunction of an output signal from the frequency demultiplier D13 and an output signal from the frequency demultiplier D14; a NAND-circuit NAND2 for obtaining a non-conjunction of an output signal from the frequency demultiplier D13 and an inverted output signal from the frequency demultiplier D14; a NAND-circuit NAND3 for obtaining a non-conjunction of an inverted output signal from the frequency demultiplier D13 and an inverted output signal from the frequency demultiplier D14; and a NAND-circuit NAND4 for obtaining a non-conjunction of an inverted output signal from the frequency demultiplier D13 and an output signal of the frequency demultiplier D14. Inverters IV22 to IV25 a reconnected to the output terminals of the NAND-circuits NAND1 to NAND4, respectively, and output signals of the inverters are the output signals CLK1 to CLK4.

Additionally, inverters IV32, IV33, IV40, IV41, IV48, and IV49 are connected in series to the inverter IV22, and output signals from the inverters IV33, IV41, and IV49 respectively act as the clock signals CLK5, CLK9, and CLK13.

In the same manner, inverters IV30, IV31, IV38, IV39, IV46, and IV47 are connected in series to the inverter IV23, and output signals of the inverters IV31, IV39, and IV47 respectively act as the clock signals CLK6, CLK10, and CLK14.

Further, inverters IV28, IV29, IV36, IV37, IV44, and IV45 are connected in series to the inverter IV24, and output signals of the inverters IV29, IV37, and IV45 respectively act as the clock signals CLK7, CLK11, and CLK15.

Furthermore, inverters IV26, IV27, IV34, IV35, IV42, and IV43 are connected in series to the inverter IV25, and output signals of the inverters IV33, IV41, and IV49 respectively act as the clock signals CLK8, CLK12, and CLK16.

In the clock driver configured as above, first, the clock signals CLK1 to CLK4 with four phases are produced from the clock signal CLK0. The clock signals CLK1 to CLK4 are delayed by an even number of inverters connected in series, so that the clock signals CLK5 to CLK8, the clock signals CLK9 and CLK12, and the clock signals CLK13 to CLK16 are produced in order.

Moreover, in the clock driver shown in FIG. 18, delay circuits DL4, DL8, and DL12 are connected in series to the inverter IV22, delay circuits DL3, DL7, and DL11 are connected in series to the inverter IV23, and delay circuits DL2, DL6, and DL10 are connected in series to the inverter IV24. Inverters IV50 to IV53 connected in series are further provided, and the clock signal CLK0 is inputted to the input terminal of the inverter IV50. An output signal of the inverter IV52 is inputted to the clock terminals of the delay circuits DL1 to DL4 and the delay circuits CL9 to DL12, and an output signal of the inverter IV53 is inputted to the clock terminals of the delay circuits DL5 to DL8.

Additionally, output signals of the delay circuits DL1 to DL4 respectively act as the clock signals CLK8, CLK7, CLK6, and CLK5. Output signals of the delay circuits DL5 to DL8 respectively act as the clock signals CLK12, CLK11, CLK10, and CLK9. Output signals of the delay circuits DL9 to DL12 respectively act as the clock signals CLK16, CLK15, CLK14, and CLK13.

Moreover, as shown in FIG. 19, each of the delay circuits DL1 to DL12 is provided with inverters IV62 and IV63 connected in series to an input terminal where an input signal IN is inputted. An output signal of the inverter IV63 acts as an output signal of the delay circuit. Additionally, a transfer gate G11 is provided between the inverter IV62 and the input terminal. Further, a clocked inverter CIV1 is provided, which has an input terminal connected to the output terminal of the inverter IV62 and an output terminal connected to an input terminal of the inverter IV62. An inverter IV61 is connected to the clock terminal, and the operations of the transfer gate G11 and the clocked inverter CIV1 are switched by an output signal of the inverter IV61 and a clock signal C inputted to the clock terminal.

In the clock driver configured as above, first, the clock signals CLK1 to CLK4 with four phases are produced from the clock signal CLK0, and the clock signals CLK1 to CLK4 are delayed by the delay circuits so as to successively produce the clock signals CLK5 to CLK8, the clock signals CLK9 to CLK12, and the clock signals CLK13 to CLK16.

Additionally, the reset signals shown in FIGS. 17 and 18 are the same as that shown in FIG. 7.

Such a clock driver is also applicable to clock signals with eight phases that are described in the first and second embodiments.

Moreover, the foregoing embodiments concern a non-contact IC card for receiving a signal from the outside by an antenna and generating internal electricity. However, problems appearing in a non-contact IC card exist in electronic equipment including power source such as a mercury cell having low supplying capacity. The present invention is not limited to a non-contact IC card but is also applicable to battery-operated electronic equipment.

What is claimed is:

1. A booster, comprising:
   first to k-th (k is an even number) transistors connected to one another in series;
   first to k-th capacitors each having a terminal connected to a gate and a source of each of said first to k-th transistors; and
   a clock driver which supplies clock signals out of phase with one another to the other terminals of said first to k-th capacitors, said clock driver simultaneously supplies clock signals to said first to k-th capacitors, wherein the clock signals at two or more adjacent capacitors of said first to k-th capacitors are at a low level simultaneously;
   wherein said clock driver comprises:
   a frequency demultiplier which divides a reference clock signal into divided signals and inverted divided signals, which are inverted signals of said divided signals; and
   a circuit which receives said divided signals and said inverted divided signals, and outputs said clock signals with k number of phases.

2. A booster, comprising:
   first to k-th (k is an even number) transistors connected to one another in series;
   first to k-th capacitors each having a terminal connected to a gate and a source of each of said first to k-th transistors; and
   a clock driver which supplies clock signals out of phase with one another to the other terminals of said first to k-th capacitors, said clock driver simultaneously supplies clock signals to said first to k-th capacitors, wherein the clock signals at two or more adjacent capacitors of said first to k-th capacitors are at a low level simultaneously;

wherein said first to k-th capacitors are divided into groups, each group comprising n capacitors (n is a submultiple of k), and clock signals with n phases are supplied to said first to n-th capacitors, wherein each phase of said clock signals is coupled to at least one group of capacitors;

wherein said clock driver comprises:
- a frequency demultiplier which divides a reference clock signal to said clock signals with n number of phases; and
- a delay circuit which delays said clock signals with n number of phases by a fixed amount for each of said groups.

3. The booster according to claim 2, wherein said delay circuit comprises an even number of inverters connected to one another in series.

4. A booster, comprising:

first to k-th (k is an even number) transistors connected to one another in series;

first to k-th capacitors each having a terminal connected to a gate and a source of each of said first to k-th transistors; and a clock driver which supplies clock signals out of phase with one another to the other terminals of said first to k-th capacitors, said clock driver simultaneously supplies clock signals to said first to k-th capacitors, wherein the clock signals at two or more adjacent capacitors of said first to k-th capacitors are at a low level simultaneously;

further comprising a transistor which is connected to a first transistor of said first to k-th transistors and receives a clock signal which is also supplied to one of said first to k-th capacitors.

* * * * *

UNITED STATES PATENT AND TRADEMARK OFFICE
CERTIFICATE OF CORRECTION

PATENT NO.   : 6,525,595 B2
DATED        : February 25, 2003
INVENTOR(S)  : Satoru Oku It is certified that error appears in the above-identified patent and that said Letters Patent is hereby corrected as shown below:

<u>Title page, Item [54] and Column 1, lines 1-3,</u>
Please delete the title of the invention "BOOSTER, IC CARD HAVING THE SAME, AND ELECTRONIC EQUIPMENT HAVING THE SAME" and insert
-- VOLTAGE BOOSTING CIRCUIT --.

<u>Column 11,</u>
Line 4, delete "T here" insert -- There --;
Lines 17 and 18, delete "a reconnected" insert -- are connected --

Signed and Sealed this

Sixteenth Day of September, 2003

JAMES E. ROGAN
*Director of the United States Patent and Trademark Office*